US010790774B2

(12) United States Patent
Takahashi et al.

(10) Patent No.: US 10,790,774 B2
(45) Date of Patent: Sep. 29, 2020

(54) DRIVE SYSTEM FOR ELECTRIC MOTOR

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Yoshimitsu Takahashi, Nisshin (JP); Masahito Fujieda, Nisshin (JP); Tetsuya Yamada, Nisshin (JP); Ryuji Omata, Kariya (JP); Kiyotaka Matsubara, Ichinomiya (JP); Makoto Nakamura, Okazaki (JP); Daigo Nobe, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/442,606

(22) Filed: Jun. 17, 2019

(65) Prior Publication Data

US 2019/0386599 A1 Dec. 19, 2019

(30) Foreign Application Priority Data

Jun. 18, 2018 (JP) ................................. 2018-115286

(51) Int. Cl.
*H02P 27/06* (2006.01)
*H02M 5/32* (2006.01)
*H02P 7/291* (2016.01)

(52) U.S. Cl.
CPC .............. *H02P 27/06* (2013.01); *H02M 5/32* (2013.01); *H02P 7/291* (2016.02)

(58) Field of Classification Search
USPC ......................................................... 318/560
See application file for complete search history.

(56) References Cited

U.S. PATENT DOCUMENTS

2010/0289425 A1* 11/2010 Huang ................. G09G 3/3406
 315/250
2015/0077030 A1* 3/2015 Soh ......................... H02P 27/08
 318/504

(Continued)

FOREIGN PATENT DOCUMENTS

JP 2010-166813 A 7/2010
JP 2012-157102 A 8/2012

(Continued)

*Primary Examiner* — Bentsu Ro
(74) *Attorney, Agent, or Firm* — Oliff PLC

(57) ABSTRACT

A drive system for an electric motor includes a first inverter that includes first switching elements, a second inverter that includes second switching elements, and a control unit that includes a first inverter control calculation section controlling on-off operation of each of the first switching elements based on a first carrier wave and a first modulation wave, a second inverter control calculation section controlling on-off operation of each of the second switching elements based on a second carrier wave and a second modulation wave, and a control synchronization section synchronizing the first carrier wave with the second carrier wave. When a sum of voltages of the first voltage source and the second voltage source is more than a voltage determination threshold, and torque of a rotating electric machine is smaller than a torque determination threshold, the control synchronization section synchronizes the first carrier wave with the second carrier wave.

5 Claims, 11 Drawing Sheets

(56) References Cited

U.S. PATENT DOCUMENTS

2016/0211767 A1 7/2016 Hotta
2018/0152127 A1* 5/2018 Park .................. H02P 21/12

FOREIGN PATENT DOCUMENTS

JP   2012-231644 A   11/2012
JP   2015-211479 A   11/2015

* cited by examiner

DRIVE SYSTEM FOR ELECTRIC MOTOR

CROSS-REFERENCE TO RELATED APPLICATION

This application is based on and claims the benefit of priority from earlier Japanese Patent Application No. 2018-115286 filed Jun. 18, 2018, the description of which is incorporated herein by reference.

BACKGROUND

Technical Field

The present disclosure relates to a drive system for an electric motor.

Related Art

Control apparatuses that control drive of a motor are known.

SUMMARY

As an aspect of the present disclosure, a drive system for an electric motor is provided, the system controlling drive of a rotating electric machine having windings for a plurality of phases. The system includes: a first inverter that includes first switching elements and is connected to one end of each of the windings and a first voltage source; a second inverter that includes second switching elements and is connected to the other end of each of the windings and a second voltage source that is provided separately from the first voltage source; and a control unit that includes a first inverter control calculation section controlling an on-off operation of each of the first switching elements based on a first carrier wave and a first modulation wave, a second inverter control calculation section controlling an on-off operation of each of the second switching elements based on a second carrier wave and a second modulation wave, and a control synchronization section synchronizing the first carrier wave with the second carrier wave. When a sum of a voltage of the first voltage source and a voltage of the second voltage source is more than a voltage determination threshold, and torque of the rotating electric machine is smaller than a torque determination threshold, the control synchronization section synchronizes the first carrier wave with the second carrier wave.

DETAILED DESCRIPTION OF THE PREFERRED EMBODIMENTS

Control apparatuses that control drive of a motor are known. For example, Japanese Patent Application Publication No. 2012-157102 discloses a motor control apparatus in which as pressure in a space where a motor is disposed becomes lower, at least one of an on-period and an off-period of each of switching elements is controlled to become longer, so that voltage stress caused by superposition of transient overvoltages is reduced.

Japanese Patent Application Publication No. 2012-157102 discloses a configuration in which one inverter is provided for one motor. However, the above Publication has no description about superposition of surge voltages in a configuration including two power supplies and two inverters, the two power supplies being respectively provided to two ends of open windings, the two inverters being respectively provided to the two ends of the open windings.

The present disclosure, which has been made to solve the above-described problem, is directed to providing a drive system for an electric motor, the system being capable of reducing a surge voltage in a configuration including two power supplies and two inverters.

First Embodiment

Figure 1:
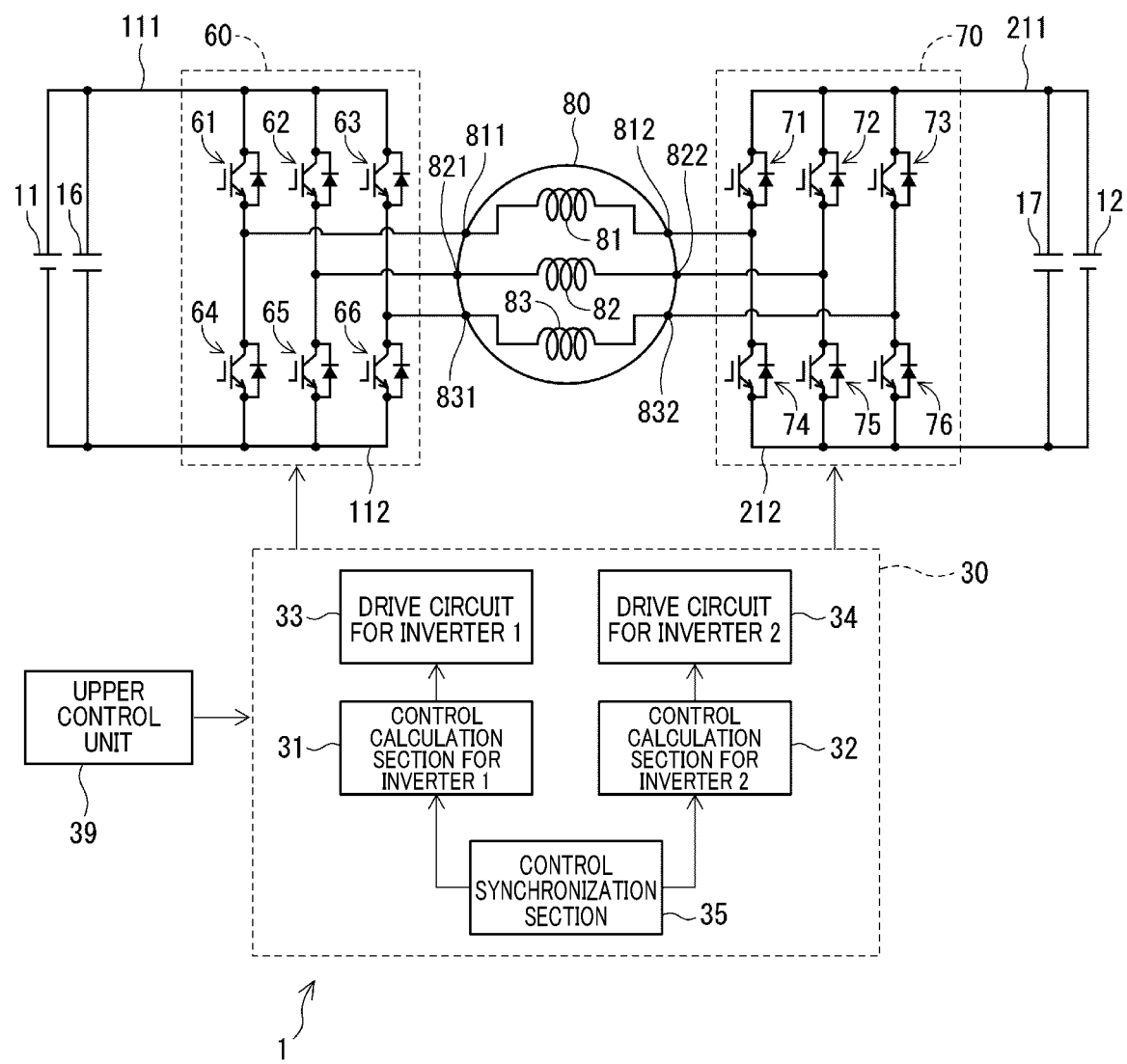
FIG. 1 is a schematic view showing a configuration of a drive system for an electric motor according to a first embodiment.

The following will describe a drive system for an electric motor according to the present disclosure with reference to the drawings. In a plurality of embodiments, substantially the same components are denoted by the same reference numerals, and the descriptions thereof will be omitted. As shown in FIG. 1, a drive system 1 for an electric motor according to the first embodiment is mounted in a vehicle not shown. The vehicle is, for example, an electric-driven vehicle such as an electric vehicle or a hybrid vehicle. A motor 80 as a rotating electric machine is, for example, a permanent magnet synchronous three-phase AC motor, and has a U-phase coil 81, a V-phase coil 82, and a W-phase coil 83. In the present embodiment, the coils 81 to 83 correspond to windings. The motor 80 is a so-called traction unit motor that generates torque for driving drive wheels not shown, and is a motor generator that has a function as an electric motor for driving the drive wheels and a function as a generator that generates electric power by being driven by kinetic energy transmitted from an engine not shown or the drive wheels.

Electric power is supplied to the motor 80 from a first battery 11 that is a first voltage source and a second battery 12 that is a second voltage source. The first battery 11 and the second battery 12 are insulated from each other. The batteries 11 and 12 are secondary batteries that are chargeable and dischargeable, such as a nickel hydrogen battery and a lithium ion battery. Instead of the secondary battery, an electric double layer capacitor may be used as a voltage source. Hereinafter, a voltage of the first battery 11 is referred to as a first power supply voltage Vb1, and a voltage of the second battery 12 is referred to as a second power supply voltage Vb2.

The first battery 11 is connected to a first inverter 60 and is provided so as to be able to exchange electric power with the motor 80 via the first inverter 60. The second battery 12 is connected to a second inverter 70 and is provided so as to be able to exchange electric power with the motor 80 via the second inverter 70. Thus, the electric power is supplied to the motor 80 from the first battery 11 via the first inverter 60 and from the second battery 12 via the second inverter 70.

A first capacitor 16 is connected to a high voltage side line 111 and a low voltage side line 112. A second capacitor 17 is connected to a high voltage side line 121 and a low voltage side line 122. The capacitors 16 and 17 are smoothing capacitors.

The drive system 1 for the electric motor includes the first inverter 60, the second inverter 70, and a control unit 30. The first inverter 60 is a three-phase inverter that switches current flows to the coils 81 to 83 and includes switching elements 61 to 66, and is connected to the first battery 11 and the motor 80. The second inverter 70 is a three-phase inverter that switches current flows to the coils 81 to 83 and includes switching elements 71 to 76, and is connected to the second battery 12 and the motor 80. In the drawings, the first inverter is referred to as INVERTER 1 or INV1 and the second inverter is referred to as INVERTER 2 or INV2.

The switching elements 61 to 66 and 71 to 76 each have a switch portion and a free wheel diode. The control unit 30 controls an on-off operation of each switch portion. In the present embodiment, the switch portion is an IGBT, but another element such as a MOSFET may be used. In addition, the types of elements used may be different among the first switching elements 61 to 66 and the second switching elements 71 to 76.

The free wheel diode of each switching element is connected in parallel with the switch portion of the switching element, and allows current to flow from the low voltage side to the high voltage side. The free wheel diode may be built in, for example, similarly to a parasitic diode of a MOSFET, or may be externally connected. In addition, the free wheel diode may be a switch such as an IGBT or a MOSFET, connected so as to serve as a free wheel diode.

In the first inverter 60, the switching elements 61 to 63 are connected to the high voltage side, and the switching elements 64 to 66 are connected to the low voltage side. The high voltage side line 111 connecting the high voltage side of the switching elements 61 to 63 is connected to the positive electrode of the first battery 11. The low voltage side line 112 connecting the low voltage side of the switching elements 64 to 66 is connected to the negative electrode of the first battery 11.

One end 811 of the U-phase coil 81 is connected to a connection point of the U-phase switching elements 61 and 64. One end 821 of the V-phase coil 82 is connected to a connection point of the V-phase switching elements 62 and 65. One end 831 of the W-phase coil 83 is connected to a connection point of the switching elements 63 and 66.

In the second inverter 70, the switching elements 71 to 73 are connected to the high voltage side, and the switching elements 74 to 76 are connected to the low voltage side. The high voltage side line 121 connecting the high voltage sides of the switching elements 71 to 73 is connected to the positive electrode of the second battery 12. The low voltage side wire 122 connecting the low voltage sides of the switching elements 74 to 76 is connected to the negative electrode of the battery 12.

The other end 812 of the U-phase coil 81 is connected to a connection point of the U-phase switching elements 71 and 74. The other end 822 of the V-phase coil 82 is connected to a connection point of the V-phase switching elements 72 and 75. The other end 832 of the W-phase coil 83 is connected to a connection point of the W-phase switching elements 73 and 76.

The drive system 1 for the electric motor according to the present embodiment is provided with the batteries 11 and 12, which are two insulated voltage sources, and the motor 80 in which ends of open-windings are connected to the two independent inverters 60 and 70, respectively, thereby being configured by two power supplies and two inverters.

The control unit 30 includes a first inverter control calculation section 31, a second inverter control calculation section 32, a first inverter drive circuit 33, a second inverter drive circuit 34, and a control synchronization section 35. The inverter control calculation sections 31 and 32 are mainly configured by microcomputers each including a CPU, a ROM, a RAM, an input and output device (I/O), and a bus line connecting these components. Each process in the control unit 30 may be a software process performed by executing a program stored in advance in a tangible memory device (that is, a readable non-transitory tangible recording medium) such as a ROM, by a CPU. For example, a hardware process may be performed by an electronic circuit such as a field-programmable gate array (FPGA).

The first inverter control calculation section 31 acquires a torque command value trq * from an upper control unit 39, and controls the on-off operation of each of the switching elements 61 to 66 of the first inverter 60. The first inverter control calculation section 31 generates a control signal related to control of the on-off operation of each of the switching elements 61 to 66 based on, for example, a first modulation wave and a first carrier wave Carr1, and outputs the generated control signal to the first inverter drive circuit 33.

The second inverter control calculation section 32 acquires the torque command value trq * from the upper control unit 39 and controls the on-off operation of each of the switching elements 71 to 76 of the second inverter 70. The second inverter control calculation section 32 generates a control signal related to control of the on-off operation of each of the switching elements 71 to 76 based on, for example, a second modulation wave and a second carrier wave Carr2, and outputs the generated control signal to the second inverter drive circuit 34. The inverter control calculation sections 31 and 32 are respectively configured by separate microcomputers.

The first inverter drive circuit 33 outputs a drive signal in accordance with the control signal acquired from the first inverter control calculation section 31 to the first inverter 60. The second inverter drive circuit 34 outputs a drive signal in accordance with the control signal acquired from the second inverter control calculation section 32 to the second inverter 70.

The control synchronization section 35 synchronizes the first carrier wave Carr1 with the second carrier wave Carr2. The carrier frequency is, for example, 5 kHz. The synchronization frequency of the carrier waves Carr1 and Carr2 is substantially the same as a modulation frequency determined by a rotational speed N. In FIG. 1, the control synchronization section 35 is provided outside the microcomputers constituting the inverter control calculation sections 31 and 32, but may be included in at least one of the microcomputers constituting the inverter control calculation sections 31 and 32. Information for synchronization may be transmitted from one of the microcomputers to the other of the microcomputers by communication.

The control in accordance with the modulation wave includes sine wave PWM control in which an amplitude of the modulation wave is equal to or less than an amplitude of the carrier wave, that is, the modulation factor is 1 or less, and overmodulation PWM control in which the amplitude of the modulation wave is larger than the amplitude of the carrier wave, that is, the modulation factor is more than 1. The amplitude of the modulation wave may be regarded as infinite, and rectangular wave control may be performed in which the on-off state of each element is switched every half cycle of the modulation wave. The rectangular wave control may also be regarded as 180° conduction control in which the on-off state of each element is switched every electrical angle of 180°. In the rectangular wave control, the conduction phase may be other than 180°. For example, 120° conduction may be adopted.

The following will describe a drive mode of the motor 80. In the present embodiment, the drive mode of the motor 80 includes a single-side drive mode using electric power of the first battery 11 or the second battery 12 and a both-sides drive mode using the electric power of the first battery 11 and the second battery 12. As the drive mode of the motor 80, in accordance with a rotational speed and torque of the motor 80, the single-side drive mode is selected when the load is relatively low, and the both-sides drive mode is selected when the load is high.

In the single-side drive mode, when the motor 80 is driven by the electric power of the first battery 11, one of all phases of the switching elements 71 to 73 that are upper arm elements of the second inverter 70 and all phases of the switching elements 74 to 76 that are lower arm elements is turned on. The other of all phases of the switching elements 71 to 73 and all phases of the switching elements 74 to 76 is turned off. As a result, the second inverter 70 serves as a neutral point. In accordance with a drive request to the motor 80, the first inverter 60 is controlled by control such as PWM control and rectangular wave control. When the motor 80 is driven by the electric power of the second battery 12, one of all phases of the switching elements 61 to 63 that are upper arm elements of the first inverter 60 and all phases of the switching elements 64 to 66 that are lower arm elements is turned on. The other of all phases of the switching elements 61 to 63 and all phases of the switching elements 64 to 66 is turned off. As a result, the first inverter 60 serves as a neutral point. In accordance with the drive request to the motor 80, the second inverter 70 is controlled by control such as the PWM control and the rectangular wave control.

In the both-sides drive mode, the phases of the first modulation wave and the second modulation wave are inverted to each other. In other words, the first modulated wave and the second modulated wave are out of phase by approximately 180°. The phase difference between the first modulation wave and the second modulation wave is set to 180°, so that it can be assumed that the first battery 11 and the second battery 12 are electrically connected in series. A voltage corresponding to the sum of a voltage of the first battery 11 and a voltage of the second battery 12 can be applied to the motor 80. Although the phase difference between the first modulation wave and the second modulation wave is 180°, a certain deviation can be allowed as long as the voltage corresponding to the sum of the voltage of the first battery 11 and the voltage of the second battery 12 can be applied to the motor 80. In FIGS. 4, 5, 6, 11, and 12, regarding the first modulation wave, the U phase is represented by U1, the V phase is represented by V1, and the W phase is represented by W1. Regarding the second modulation wave, the U phase is represented by U2, the V phase is represented by V2, and the W phase is represented by W2. The U phase is indicated by a solid line, the V phase is indicated by a broken line, and the W phase is indicated by an alternate long and short dash line.

Figure 2:
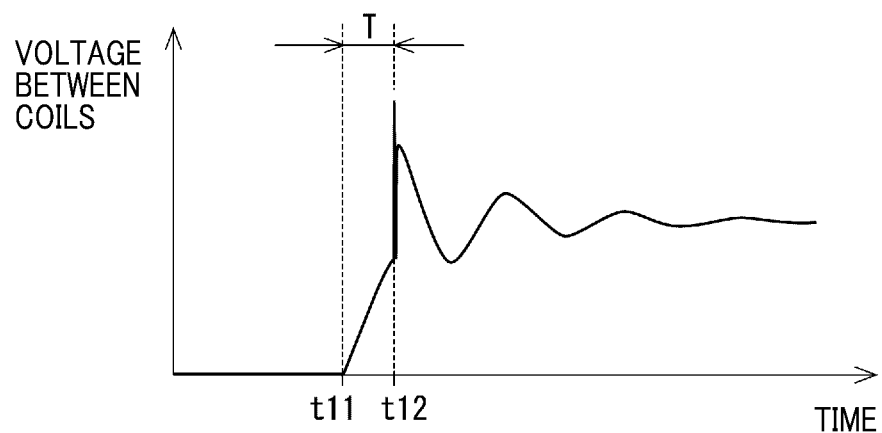
FIG. 2 is a time diagram illustrating superposition of a surge voltage in both-sides drive control, according to the first embodiment.
Figure 3:
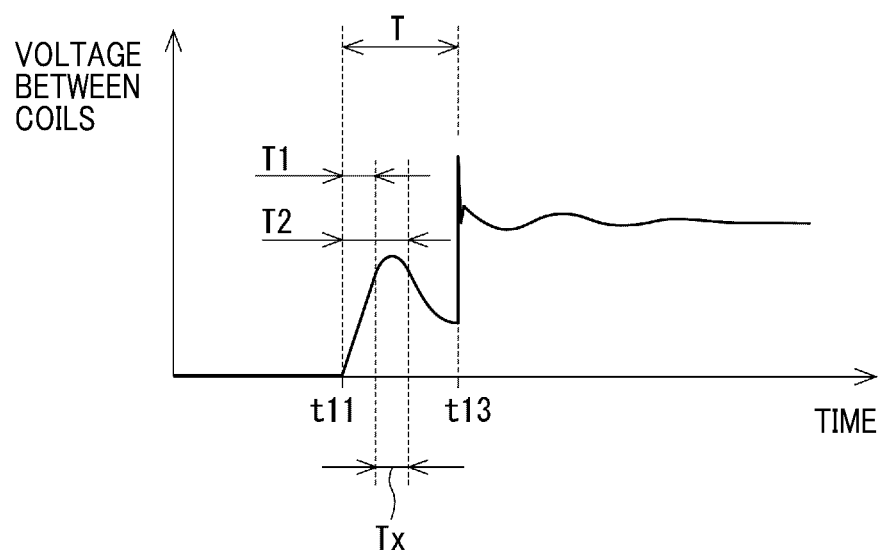
FIG. 3 is a time diagram illustrating superposition of a surge voltage in the both-sides drive control, according to the first embodiment.

The following will describe a voltage between the coils in the both-sides drive mode with reference to FIGS. 2 and 3. In FIGS. 2 and 3, the horizontal axis indicates time, and the vertical axis indicates the voltage between the coils. The voltage between the coils is, for example, in the U-phase, a voltage between the one end 811 on a side of the first inverter 60 and the other end 812 on a side of the second inverter 70. Similarly, in the V-phase, the voltage between the coils is a voltage between the one end 821 and the other end 822, and in the W-phase, the voltage between the coils is a voltage between the one end 831 and the other end 832.

In the case in which the motor 80 is driven, when the switching operation is performed in the inverters 60 and 70, a surge voltage is generated due to LC resonance caused by the inductance components and the ground capacitances in the inverters 60 and 70 and the motor 80. When the surge voltage exceeds a discharge generation voltage Vd, partial discharges occur at the contact points of the coils 81 to 83. If the partial discharges continue, insulating coatings of the coils 81 to 83 may be corroded, so that insulation breakdown may occur. Therefore, it is important that the surge voltage is reduced not to cause partial discharges or to decrease the occurrence frequency of the partial discharges, in order to ensure the insulation performance, which is particularly important in the case in which the power supply voltages Vb1 and Vb2 are increased to be a high voltage in order to provide high output.

The inventers of the present disclosure have found that when a switching operation is performed by one of the inverters in the both-sides drive mode, the voltage between the coils oscillates at a resonance frequency fc of common mode current flowing in series through the ground capacitances of the two inverters 60 and 70, and the surge voltage is maximized when a switching interval T of the two inverters 60 and 70 becomes a ¼ cycle of a resonance cycle Tc.

In FIG. 2, in the V phase and the W phase of the first inverter 60, at time t11, the switching elements 65 and 66 are turned from on to off, and the switching elements 62 and 63 are turned from off to on. At time t12 delayed from time t11 by the ¼ cycle of the resonance cycle Tc, in the U phase of the second inverter 70, the switching element 74 is turned from on to off and the switching element 71 is turned from off to on.

When the switching operations of the V phase and the W phase of the first inverter 60 are performed at time t11, the voltage between the coils oscillates at the resonance frequency fc. When the switching operation of the U phase of the second inverter 70 is performed at time t12 at which the resonance component of the voltage between the coils peaks, the surge component due to the switching is superimposed on the peak of the resonance component, and the voltage between the coils becomes maximum.

As shown in FIG. 3, a range from the end of a period T1 to the end of a period T2 is referred to as a switching avoidance period Tx. The switching avoidance period Tx is set to a period including the ¼ cycle of the resonance cycle Tc. At time t11, the switching operation of the V phase and the W phase of the first inverter 60 are performed, and at time t13 that is later than time t12 in FIG. 2 and is timing outside the switching avoidance period Tx, when the switching operation of the U phase of the second inverter 70 is performed, the peak of the voltage between the coils can be lowered compared to the example shown in FIG. 2, even if the switching surge is superimposed on the resonance component. The insulation performance can be improved by lowering the peak of the voltage between the coils. Hereinafter, performing the switching in one of the two inverters and then performing the switching in the other of the two inverters within the range of the switching avoidance period Tx is referred to as short-term continuous switching or simply continuous switching. The continuous switching tends to occur when the modulation factor is small and in a region near a zero crossing point.

Figure 4:
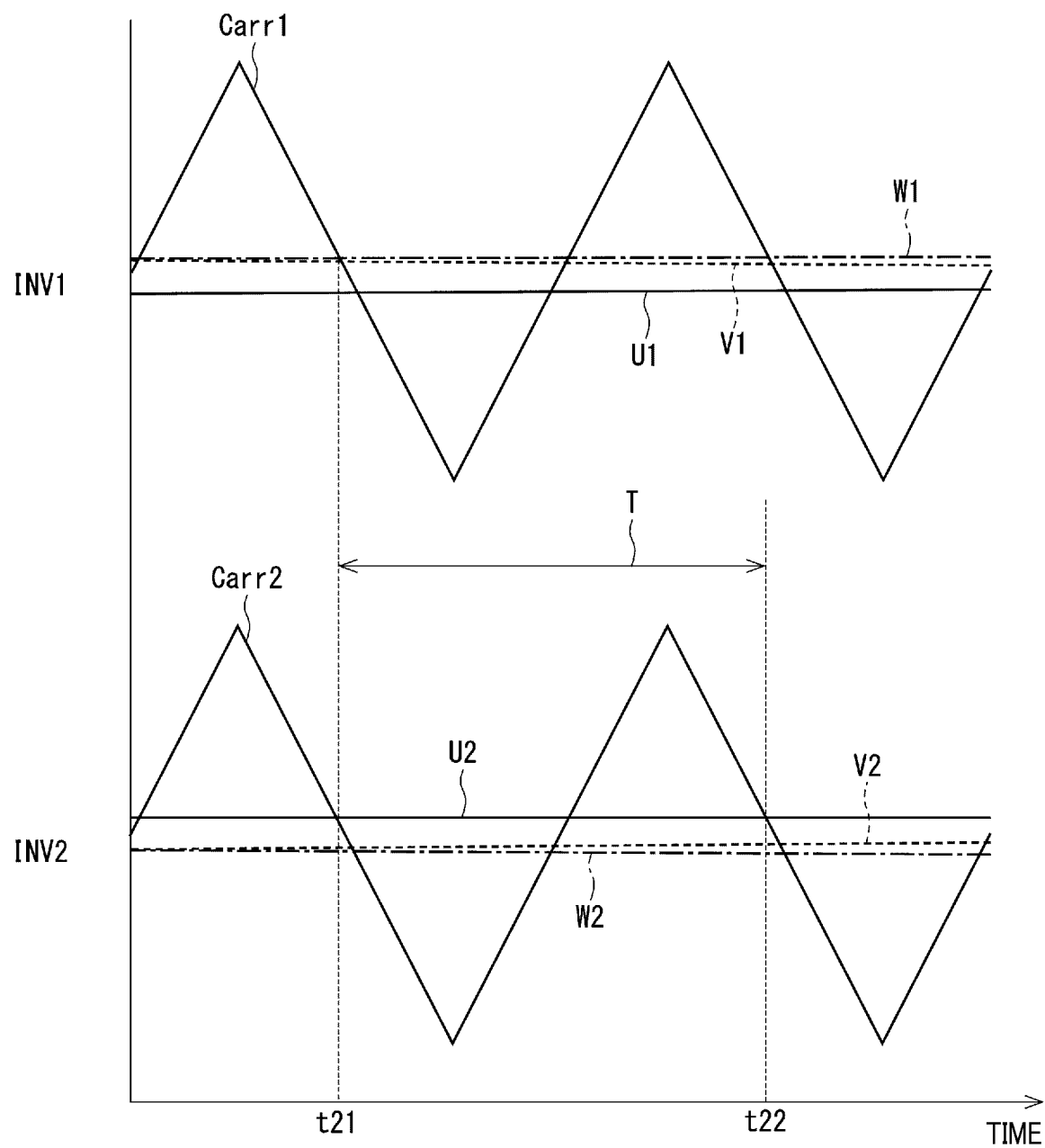
FIG. 4 is an explanatory diagram illustrating a switching interval when carrier waves are synchronized with each other, according to the first embodiment.

As shown in FIG. 4, when the carrier waves Carr1 and Carr2 are synchronized with each other, the switching operation of the V phase and the W phase of the first inverter 60 are performed at time t21, and the switching operation of the U phase of the second inverter 70 is performed at time t22. At the time, the switching interval T is, for example, approximately 100 μs that is longer than the switching avoidance period Tx.

Figure 5:
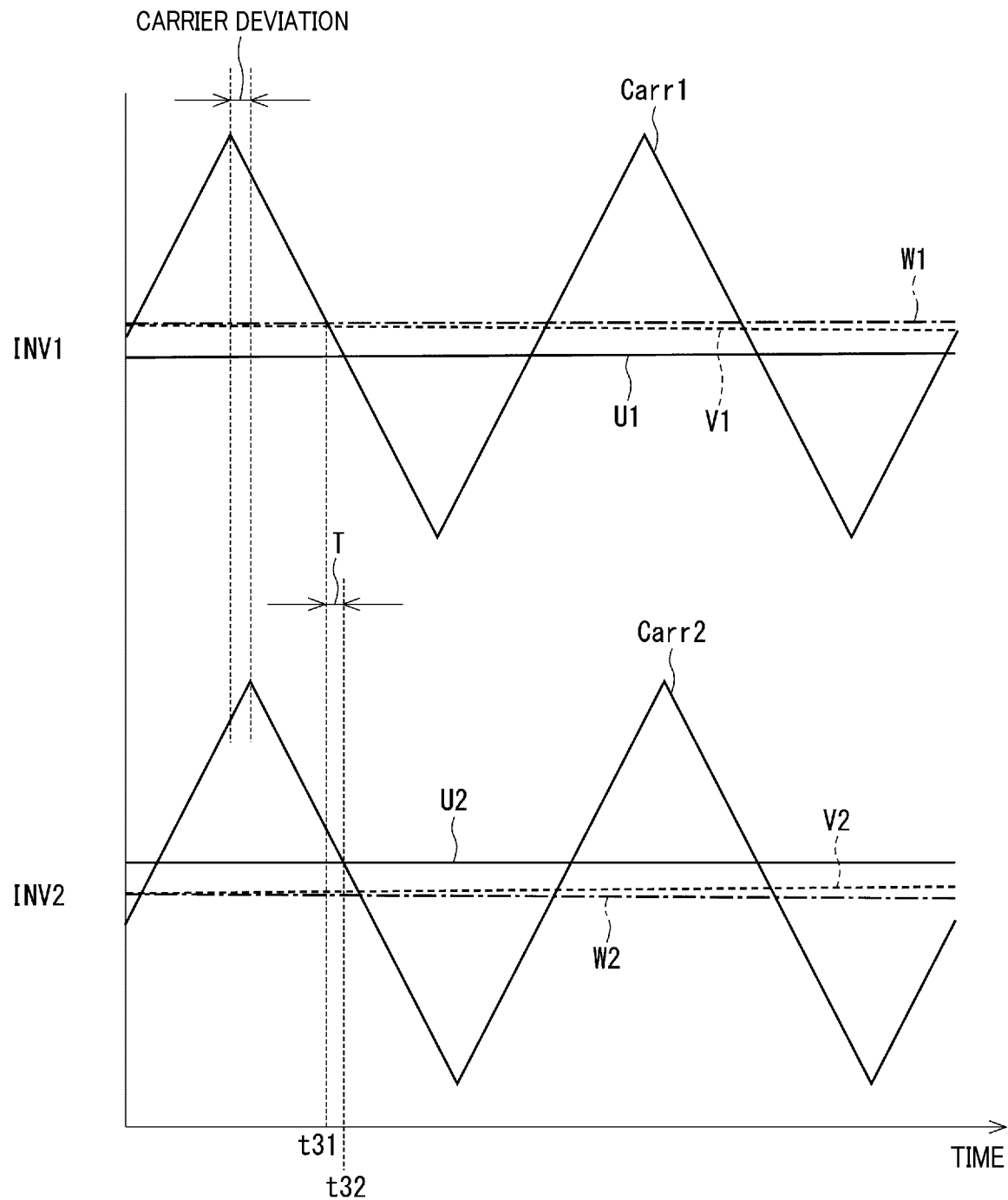
FIG. 5 is an explanatory diagram illustrating a switching interval when a carrier deviation occurs, according to the first embodiment.

As shown in FIG. 5, when a carrier deviation in the carrier waves Carr1 and Carr2 occurs, the switching operations of the V phase and the W phase of the first inverter 60 are performed at time t31, and the switching operation of the U phase of the second inverter 70 is performed at time t32. At the time, the switching interval T is, for example, approximately several μs, and is included in the switching avoidance period Tx. As a result, the switching surge generated by the switching of the second inverter 70 is superimposed near the peak of the resonance component by the switching of the first inverter 60. Therefore, the maximum surge value becomes larger than the discharge generation voltage Vd, and the partial discharge may occur continuously.

Figure 6:
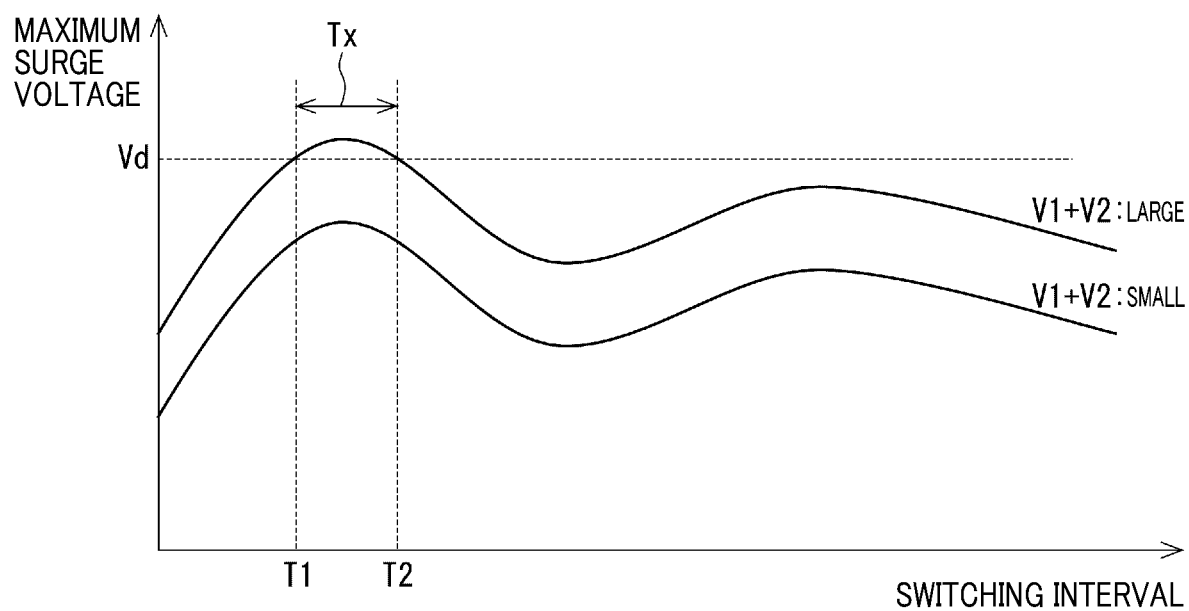
FIG. 6 is an explanatory diagram illustrating a relationship between a power supply voltage and a maximum surge voltage, according to the first embodiment.

FIG. 6 shows a relationship between the power supply voltage and the maximum surge voltage. In FIG. 6, the horizontal axis indicates a switching interval, and the vertical axis indicates a maximum surge voltage. In the both-sides drive mode, when the sum of the first power supply voltage Vb1 and the second power supply voltage Vb2 is relatively small, the maximum surge voltage does not exceed the discharge generation voltage Vd even if the switching is performed in the switching avoidance period Tx. On the other hand, when the sum of the first power supply voltage Vb1 and the second power supply voltage Vb2 is relatively large, the maximum surge voltage may exceed the discharge generation voltage Vd and a discharge may occur when the switching is performed in the switching avoidance period Tx.

Figure 7:
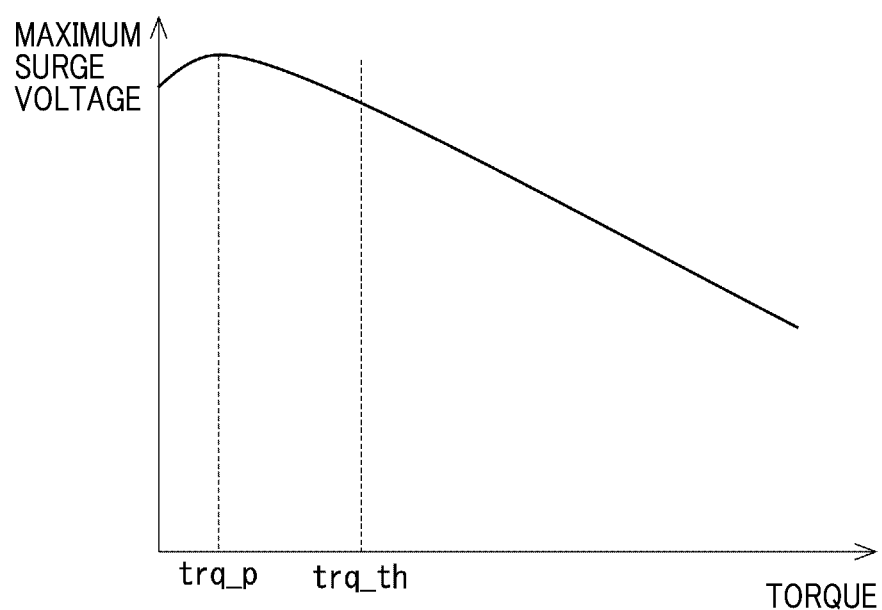
FIG. 7 is an explanatory diagram illustrating a relationship between torque and the maximum surge voltage, according to the first embodiment.

As shown in FIG. 7, a recovery surge voltage of the switching element becomes maximum when minute current flows. In detail, the maximum surge voltage peaks at a relatively small value trq_p of torque that is approximately proportional to the current, and decreases as the torque increases.

In the present embodiment, when the sum of the power supply voltages Vb1 and V2 is larger than a voltage determination threshold Vth, and the torque trq of the motor 80 is larger than the torque determination threshold trq_th, it is determined that a surge increase condition is satisfied, and then a surge reduction process for reducing the surge is performed. The surge reduction process of the present embodiment is a process for synchronizing the carrier wave Carr1 with the carrier wave Carr2. The following will describe the drive control process of the present embodiment with reference to the flowchart in FIG. 8. This process is performed by the inverter control calculation sections 31 and 32 at a predetermined cycle. Since the processes of the inverter control calculation sections 31 and 32 are similar to each other, the process of the first inverter control calculation section 31 will be described below. Hereinafter, "step" of step S101 is omitted and simply referred to as the symbol "S". Other steps are similar. The same applies to the embodiments described later.

In S101, the first inverter control calculation section 31 acquires a present drive mode of the motor 80. In S102, the first inverter control calculation section 31 determines whether the drive mode is the both-sides drive mode driven by the sum of the first power supply voltage Vb1 and the second power supply voltage Vb2. If it is determined that the drive mode is not the both-sides drive mode (S102: NO), the process proceeds to S108. If it is determined that the drive mode is the both-sides drive mode (S102: YES), the process proceeds to S103. In S103, the first inverter control calculation section 31 acquires parameters including the power supply voltages Vb1 and Vb2, the rotational speed N of the motor 80, and the torque trq of the motor 80.

In S104, the first inverter control calculation section 31 determines whether the sum of the power supply voltages Vb1 and Vb2 is larger than the voltage determination threshold Vth. The voltage determination threshold Vth is set in accordance with a value that may cause the maximum surge value to exceed the discharge generation voltage Vd due to continuous switching. If it is determined that the sum of the power supply voltages Vb1 and Vb2 is equal to or less than the voltage determination threshold Vth (S104: NO), the process proceeds to S108. If it is determined that the sum of the power supply voltages Vb1 and Vb2 is larger than the voltage determination threshold Vth (S104: YES), the process proceeds to S105.

In S105, the first inverter control calculation section 31 determines whether the rotational speed N is smaller than the rotational speed determination threshold Nth. If it is determined that the rotational speed N is equal to or more than the rotational speed determination threshold Nth (S105: NO), the process proceeds to S108. If it is determined that the rotational speed N is smaller than the rotational speed determination threshold Nth (S105: YES), the process proceeds to S106.

In S106, the first inverter control calculation section 31 determines whether the torque trq is smaller than the torque determination threshold trq_th. The torque determination threshold value trq_th is set in accordance with recovery surge characteristics of the switching element. If it is determined that the torque trq is equal to or larger than the torque determination threshold trq_th (S106: NO), the process proceeds to S108. If it is determined that the torque trq is smaller than the torque determination threshold trq_th (S106: YES), the process proceeds to S107.

In S107, the first inverter control calculation section 31 performs a carrier synchronization process as a surge reduction process based on information from the control synchronization section 35. The similar process is performed in the second inverter control calculation section 32, so that the carrier wave Carr1 are synchronized with the carrier wave Carr2. In S108, to which the process is proceeded if the determination in S102 and S104 to S106 is negative, the surge reduction process is not performed, and a normal process is performed. That is, in the present step, since the synchronization process of the carrier waves Carr1 and Carr2 is not performed, a carrier deviation may occur.

In the present embodiment, if the determination that is made in S102 and S104 to S106 is affirmative, the surge increase condition is regarded as satisfied. If the determination in any one of S102 and S104 to S106 is negative, the surge increase condition is regarded as unsatisfied. A part of the process of the determination in S104 to S106 may be omitted.

As described above, the drive system 1 for the electric motor according to the present embodiment controls the drive of the motor 80 having the plurality of coils 81 to 83 for the plurality of phases, and includes the first inverter 60, the second inverter 70, and the control unit 30.

The first inverter 60 includes the first switching elements 61 to 66, and is connected to the ends 811, 821, and 831 of the coils 81, 82, and 83, and the first battery 11. The second inverter 70 includes the second switching elements 71 to 76, and is connected to the other ends 812, 822, and 832 of the coils 81, 82, and 83, and the second battery 12 provided separately from the first battery 11.

The control unit 30 includes the first inverter control calculation section 31, the second inverter control calculation section 32, and the control synchronization section 35. The first inverter control calculation section 31 controls the on-off operation of each of the first switching elements 61 to 66 based on the first carrier wave Carr1 and the first modulation wave. The second inverter control calculation section 32 controls the on-off operation of each of the second switching elements 71 to 76 based on the second carrier wave Carr2 and the second modulation wave. If the sum of the voltage of the first battery 11 and the voltage of the second battery 12 is more than the voltage determination threshold Vth, and the torque of the motor 80 is smaller than the torque determination threshold trq_th, the control synchronization section 35 synchronizes the first carrier wave Carr1 with the second wave Carr2. In the present embodiment, the carrier waves Carr1 and Carr2 are synchronized with each other and the phases are matched with each other.

The carrier waves Carr1 and Carr2 are synchronized with each other, so that the switching interval T between the inverters 60 and 70 is expanded as compared to the case in which the carrier waves Carr1 and Carr2 deviate from each other by approximately a half cycle. As a result, the short-time continuous switching is avoided in the switching avoidance period Tx. Thus, it is possible to avoid superimposition of a switching surge, which is caused by switching in the other of the two inverters, around the peak of the resonance component generated due to switching in one of the two inverters, and the surge voltage can be reduced. Therefore, the insulation performance of the drive system 1 for the electric motor can be improved.

In the case of expanding the switching interval T with a pulse pattern as in Japanese Patent Application Publication No. 2012-157102, it is necessary to incorporate the pulse pattern into the control, so that control load increases. In addition, controllability of the motor current may be deteriorated and the efficiency may be decreased, by increase of only the pulse interval at a certain timing. In the present embodiment, the carrier waves Carr1 and Carr2 are synchronized with each other, so that it is possible to expand the switching interval T without deteriorating the controllability while increase in the control load is suppressed.

Second Embodiment

Figure 9:
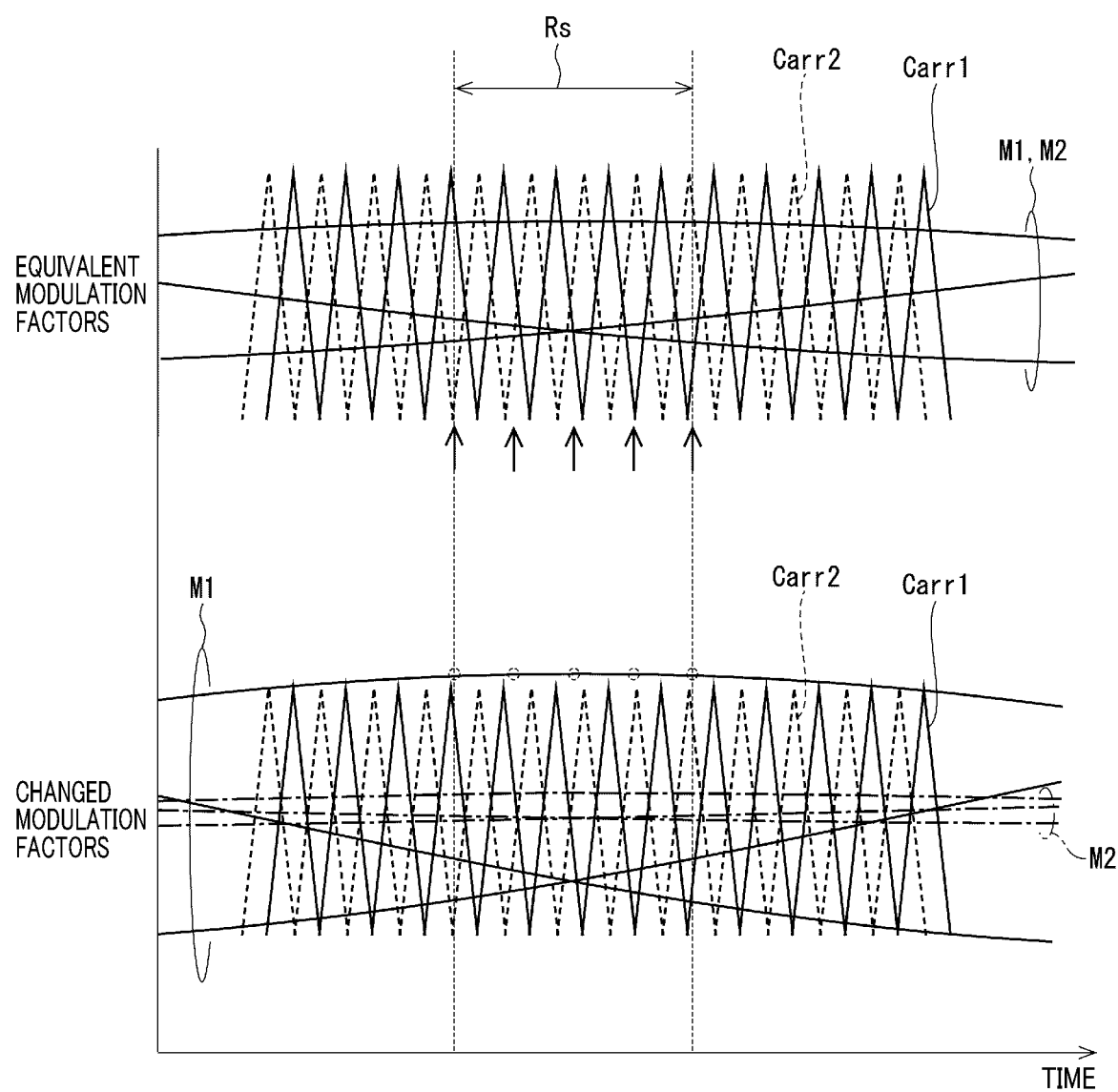
FIG. 9 is an explanatory diagram illustrating an occurrence frequency of continuous switching in accordance with a modulation factor, according to a second embodiment.
Figure 10:
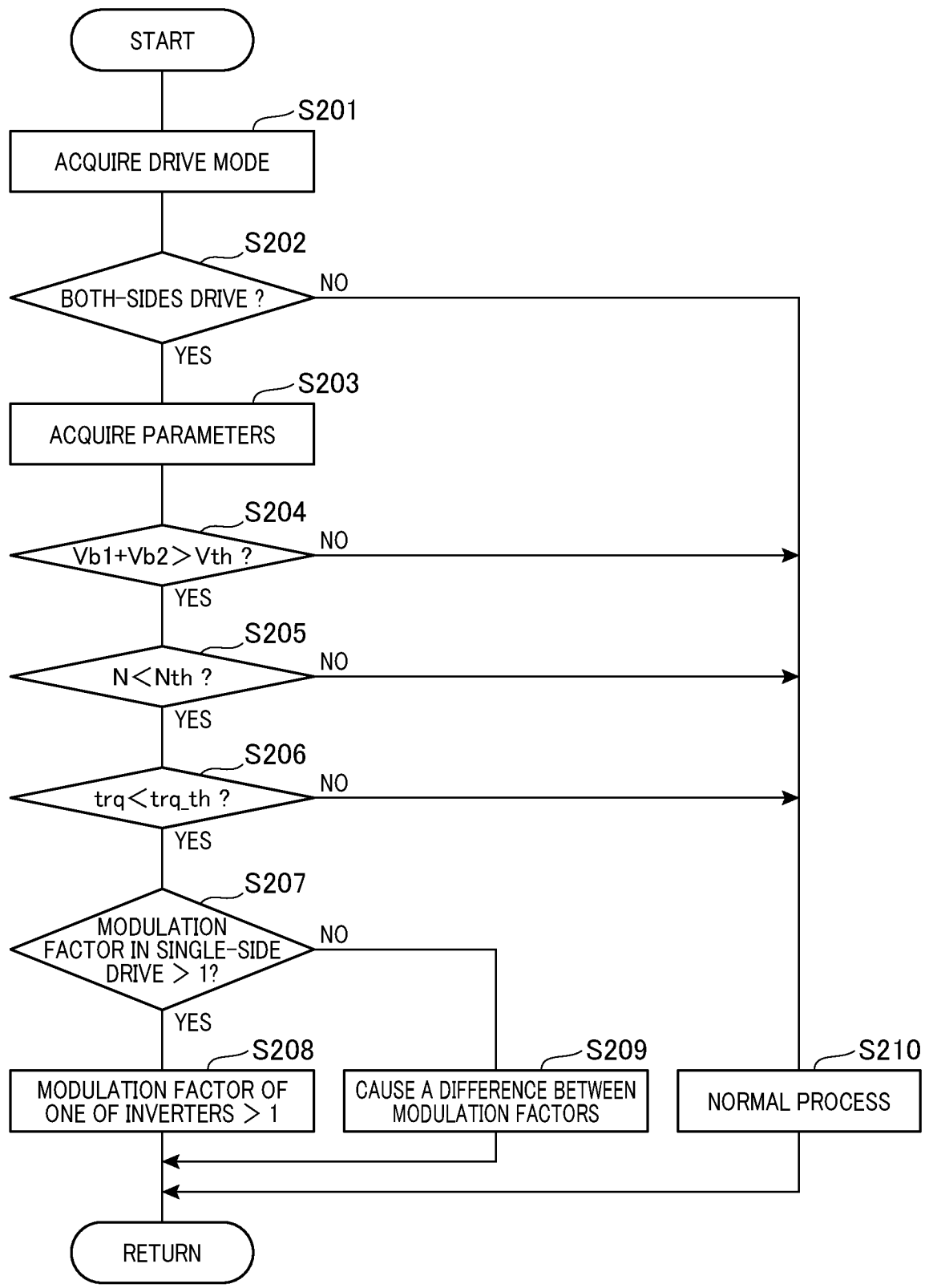
FIG. 10 is a flowchart illustrating a drive control process, according to the second embodiment.

The second embodiment is shown in FIGS. 9 and 10. The second embodiment and a third embodiment are made different in the surge voltage reduction process from the above embodiment, and therefore, the second embodiment and the third embodiment will be described focusing on this point. In the present embodiment, as the surge reduction process, the modulation factor M1 of the first modulation wave is made different from the modulation factor M2 of the second modulation wave. The similar process may be performed by the inverter control calculation sections 31 and 32, or one of the inverter control calculation sections may calculate the modulation factors M1 and M2 and may instruct the other of the inverter control calculation sections. Control signals of the inverters 60 and 70 may be generated by one microcomputer. The same applies to the third embodiment.

In the both-sides drive mode, an output is determined by the superposition of both systems. Therefore, the modulation factor of one system is increased and the modulation factor of the other system is decreased, so that a desired output is realized while the modulation factors M1 and M2 are made different from each other. In FIG. 9, a common time axis is the horizontal axis. The case in which the modulation factors M1 and M2 are equivalent is shown in an upper part of FIG. 9. The case in which the modulation factors M1 and M2 are made different in the same output is shown in a lower part of FIG. 9. In order to avoid complication, the modulated wave is described without inversion. In the lower part of FIG. 9, the first modulation wave is indicated by a solid line, and the second modulation wave is indicated by an alternate long and short dash line.

As shown in the upper part of FIG. 9, in the case in which the modulation factors M1 and M2 are equivalent, when the carrier waves Carr1 and Carr2 deviate by approximately a half cycle, continuous switching occurs in an interval Rs. Hereinafter, the interval Rs is referred to as continuous switching interval as appropriate. Since the continuous switching interval Rs is an interval in which the difference between the modulation waves of the respective phases is small, the smaller the modulation factors M1 and M2 become, the longer the continuous switching interval Rs becomes. In this example, five times of consecutive switching occur in the continuous switching interval Rs, as indicated by upward arrows. On the other hand, as shown in the lower part of FIG. 9, when the modulation factors M1 and M2 are made different, in particular, and one of the modulation factors (in the example, the modulation factor M2 of the second modulation wave) is more than 1, the switching of the first inverter 60 is not performed at the timing when the continuous switching occurs in the case in which the modulation factors M1 and M2 are equivalent (see the dotted circle). Thus, the above configuration can prevent occurrence of a partial discharge due to the continuous switching.

The following will describe the drive control process in the present embodiment, based on the flowchart in FIG. 10. The processes of S201 and S202 are similar to the processes of S101 and S102, respectively, in FIG. 8. In S203, the first inverter control calculation section 31 acquires the parameters including the power supply voltages Vb1 and Vb2, the torque trq of the motor 80, and the modulation factors M1 and M2.

Figure 8:
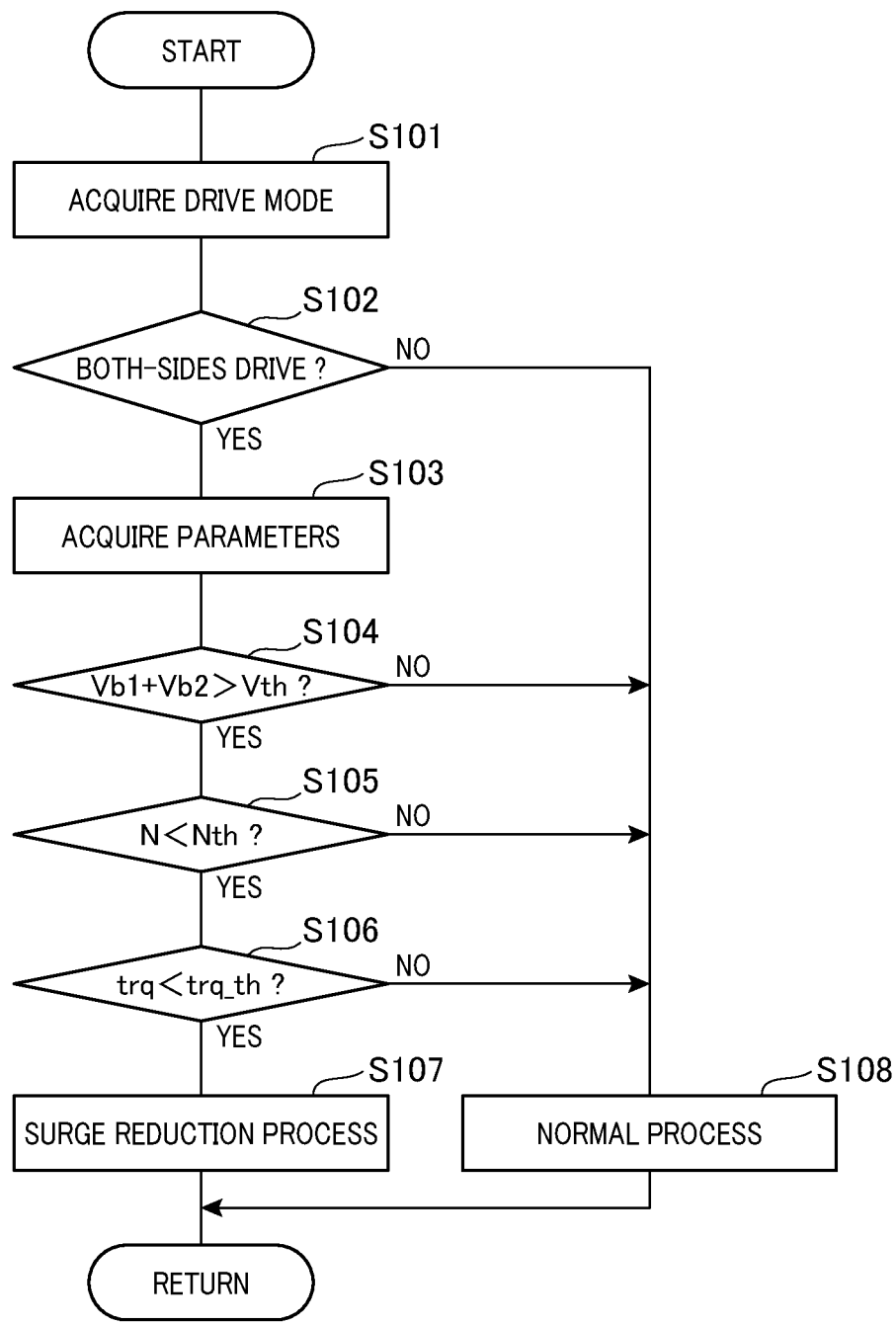
FIG. 8 is a flowchart illustrating a drive control process, according to the first embodiment.

The processes of S204 to S206 are similar to the processes of S104 to S106, respectively, in FIG. 8. If a negative determination is made in S202, S204, S205, or S206, the process proceeds to S210. In S207, the first inverter control calculation section 31 determines whether the modulation factor in the case of single-side drive is in an output area in which the modulation factor is more than 1. If it is determined that the modulation factor in the case of the single-side drive is in an output area in which the modulation factor is more than 1 (S207: YES), that is, if the modulation factors M1 and M2 are made different from each other, and the modulation factor M1 or M2 is in an output area where one of the modulation factors M1 and M2 can be overmodulated, the process proceeds to S208. If it is determined that the modulation factor in the case of the single-side drive is in an output area where the modulation factor is equal to 1 or less (S207: NO), the process proceeds to S209.

In S208, the first inverter control calculation section 31 sets the modulation factor of one of the two inverters to a predetermined value in the range in which the modulation factor is equal to 1 or more and which can be acquired by overmodulation control, and sets the modulation factor of the other of the two inverters so that a desired output is acquired. For example, when the modulation factor in the case of uniform control in both-sides drive is 0.6, the modulation factor of one of the two inverters is 1.05, and the modulation factor of the other of the two inverters is 0.15.

In S209, the first inverter control calculation section 31 causes a difference between the modulation factors of the two inverters. For example, when the modulation factor in the case of uniform control in both-sides drive is 0.4, the modulation factor of one of the two inverters is 0.6, and the modulation factor of the other of the two inverters is 0.2. Although a value that simplifies the explanation is shown above, it is effective to widen the difference between the modulation factors as much as possible. If the modulation factor in the case of uniform control in the both-sides drive is equal to 0.25 or less, output is possible by the single-side drive, and, therefore, the single-side drive may be used. In the case in which one of the two inverters is driven in overmodulation in S208, when the modulation factor exceeds 1 at least, continuous switching can be effectively avoided. In the present embodiment, the processes of S208 and S209 correspond to the surge reduction process.

In S210, the first inverter control calculation section 31 performs normal control without performing the surge reduction process. That is, in the present step, when the both-sides drive control is performed, the inverters 60 and 70 are controlled at the same modulation factor.

In the present embodiment, the control unit 30 includes the first inverter control calculation section 31 and the second inverter control calculation section 32. When the sum of the voltage of the first battery 11 and the voltage of the second battery 12 is more than the voltage determination threshold Vth, and the torque of motor 80 is smaller than the torque determination threwshold trq_th, the control unit 30 controls the modulation factor M1 of the first modulation wave and the modulation factor M2 of the second modulation wave to be different from each other. As a result, the switching interval T between the inverters 60 and 70 is expanded as compared to the case in which the modulation factors M1 and M2 are substantially the same, and short-term continuous switching is avoided. Therefore, the insulation performance can be improved.

The control unit 30 sets one of the modulation factor M1 of the first modulation wave and the modulation factor M2 of the second modulation wave to a value more than 1 and sets the other of the modulation factor M1 of the first modulation wave and the modulation factor M2 of the second modulation wave in accordance with the drive request. The surge reduction process is performed in a relatively low load region in which the torque is smaller than the torque determination threshold trq_th. Even in the low load region, it is more effective to perform the overmodulation PWM control with the modulation factor more than 1 to extend the switching interval T of the inverters 60 and 70, and short-time continuous switching is avoided. When the modulation factor of the modulation wave of one of the two inverters is made more than 1, and the modulation factor of the modulation wave of the other of the two inverters is made small, output can be realized in accordance with the drive request. The same effect as the above embodiment can be provided.

Third Embodiment

Figure 11:
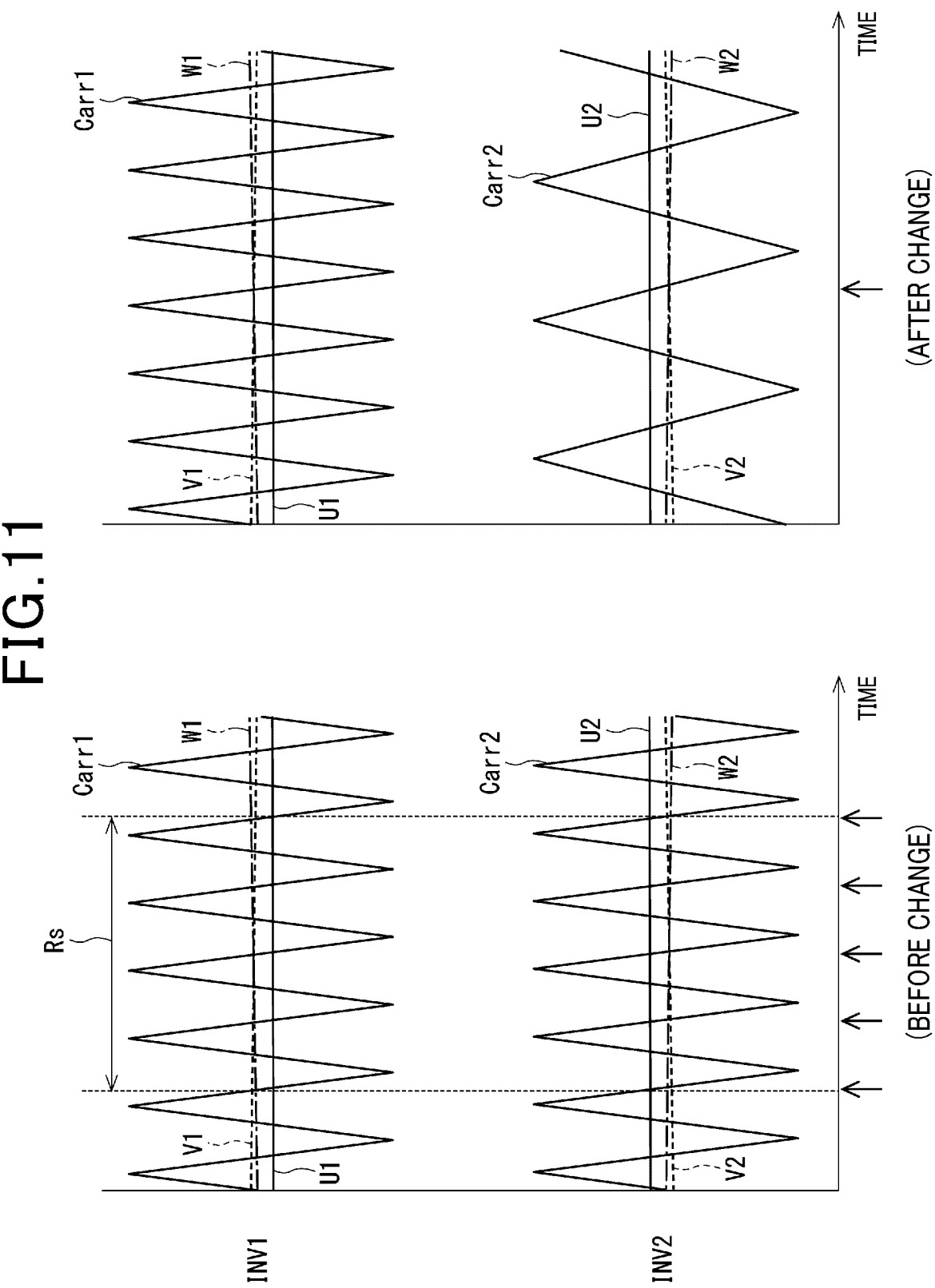
FIG. 11 is an explanatory diagram illustrating an occurrence frequency of continuous switching in accordance with a carrier frequency, according to a third embodiment.
Figure 12:
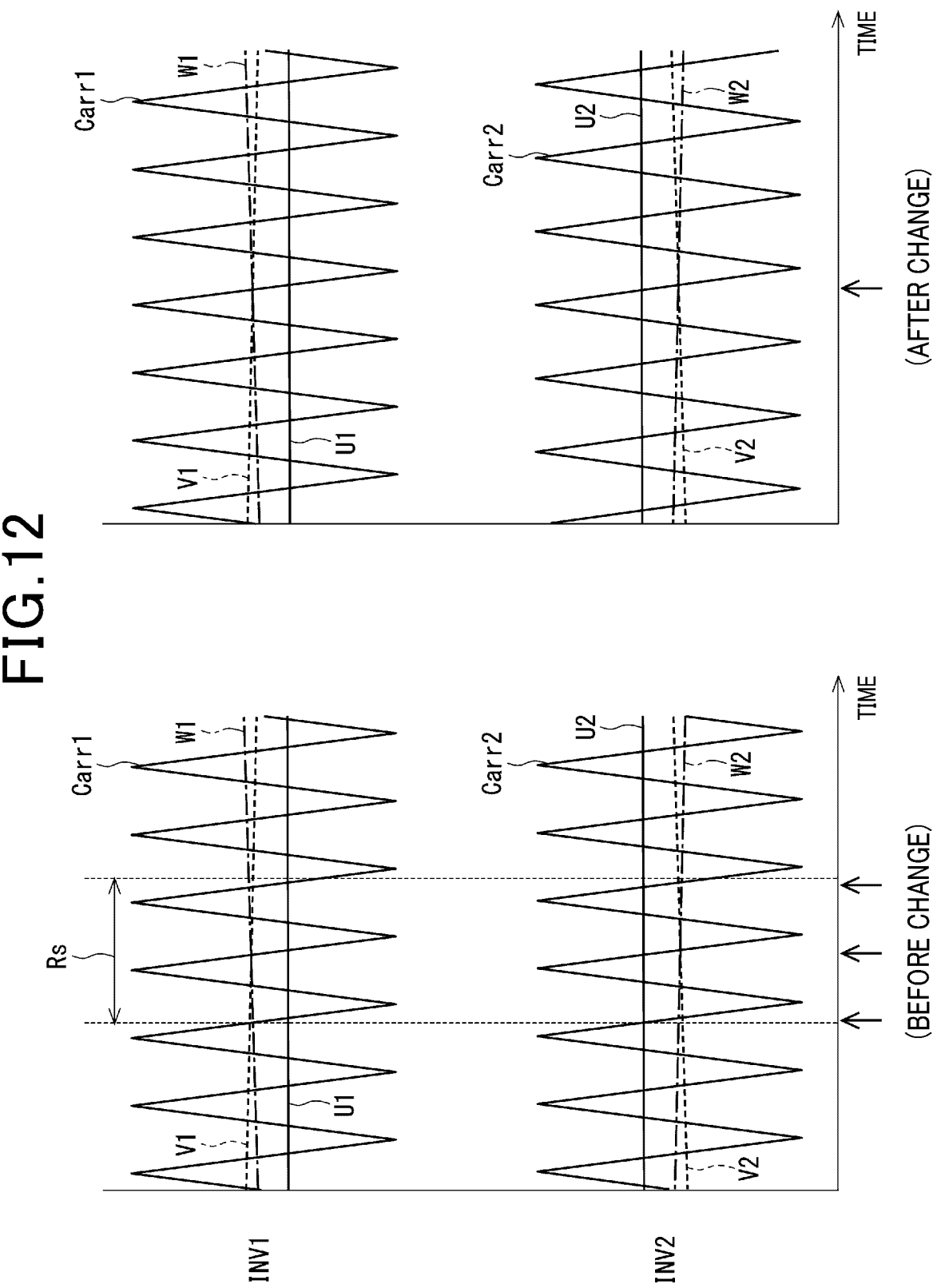
FIG. 12 is an explanatory diagram illustrating an occurrence frequency of the continuous switching in accordance with the carrier frequency, according to the third embodiment.
Figure 13:
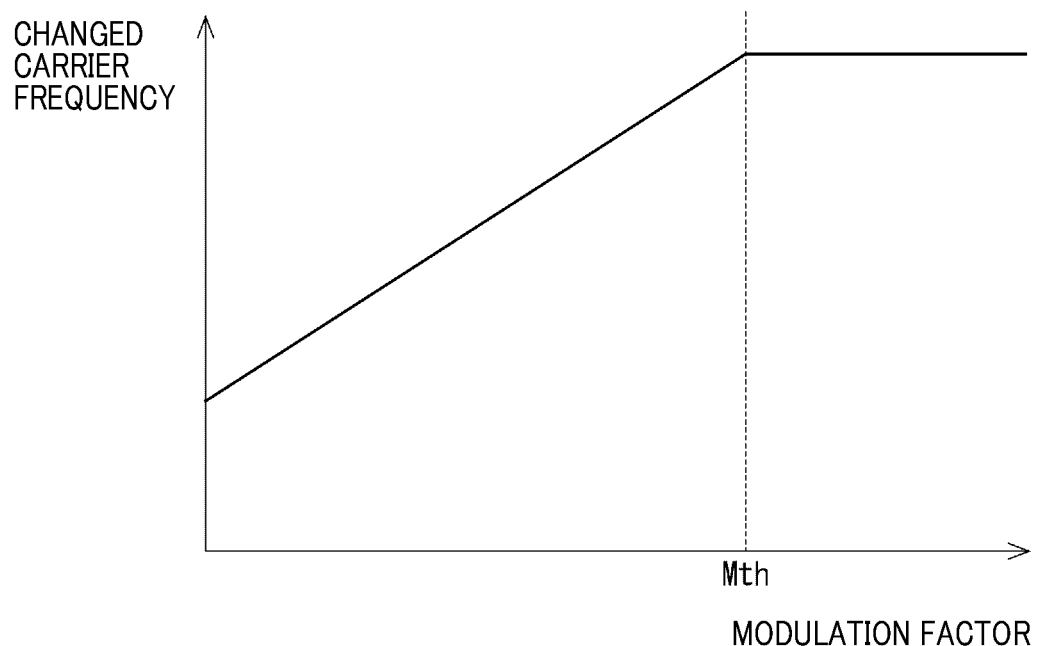
FIG. 13 is an explanatory diagram illustrating a relationship between a modulation factor and the carrier frequency changed, according to the third embodiment.

The third embodiment is shown in FIGS. 11 to 13. The drive control process in the present embodiment is similar to that in FIG. 8 and the surge reduction process in S107 is different from that in the first embodiment. In the present embodiment, as the surge reduction process, one of the carrier waves Carr1 and Carr2 is made lower in frequency than the other of the carrier waves Carr1 and Carr2. In the present embodiment, the frequency of the second carrier wave Carr2 is described as being reduced. The frequency is changed so that the half cycle of the second carrier wave Carr2 is longer than the period T2 (see FIG. 3). As a result, the number of the occurrence of continuous switching becomes at most one in the continuous switching interval Rs, so that the occurrence frequency of the continuous switching can be decreased.

The following will describe the occurrence frequency of the continuous switching with reference to FIGS. 11 and 12. In FIGS. 11 and 12, the first carrier wave Carr1 and the first modulation wave are shown in the upper part, and the second carrier wave Carr2 and the second modulation wave are shown in the lower part. The carrier waves Carr1 and Carr2, and the first and second modulation waves before changing the carrier frequency are shown on the left side of the drawing. The carrier waves Carr1 and Carr2, and the first and second modulation waves after changing the carrier frequency are shown on the right side of the drawing. Each upward arrow attached to the horizontal axes shows the occurrence timing of the continuous switching. FIG. 11 shows the case in which the modulation factors are relatively low (for example, modulation factor M1=M2=0.1). FIG. 12 shows the case in which the modulation factors are relatively high (for example, modulation factor M1=M2=0.2). In the present embodiment, the frequency of the second carrier wave Carr2 is changed, and the frequency of the first carrier wave Carr1 is the same before and after the change.

As shown in FIGS. 11 and 12, when the carrier frequency is not changed, a plurality times of continuous switching occur in the continuous switching interval Rs. As the modulation factor is lower, the continuous switching interval Rs is longer, and the occurrence number of the continuous switching is larger. Therefore, as shown in FIG. 13, in the surge reduction process in the present embodiment, the frequency of the carrier wave is determined in accordance with the modulation factors M1 and M2 so that the frequency of the carrier to be changed (the frequency of the second carrier wave Carr2 in the present embodiment) becomes lower as the modulation factors M1 and M2 are lower in the region where the modulation factors M1 and M2 are less than the modulation factor threshold Mth. As a result, the occurrence number of the continuous switching in the continuous switching interval Rs is at most one, and the occurrence frequency of the continuous switching is decreased. It is noted that FIG. 13 is a map in which the carrier frequency decreases linearly as the modulation factors M1 and M2 decrease, but may be a map in which the carrier frequency decreases nonlinearly or may decrease stepwise. The map may be set appropriately.

In the present embodiment, when the sum of the voltage of the first battery 11 and the voltage of the second battery 12 is more than the voltage determination threshold Vth, and the torque of the motor 80 is smaller than the torque determination threshold trq_th, the control unit 30 controls at least one of the frequency of the first carrier wave Carr1 and the frequency of the second carrier wave Carr2 to be lower than in an ordinary time. For example, the carrier frequency is changed such that the half period of the carrier period is longer than the period from the switching timing to a predetermined timing after the peak of the resonant component due to switching. As a result, since the occurrence frequency of the short-time continuous switching can be decreased, the insulation performance can be improved.

The carrier frequency is set lower as the modulation factors M1 and M2 of the modulation wave are lower. As a result, it is possible to appropriately set the carrier frequency that achieves both the decrease in the occurrence frequency and the controllability of the continuous switching. The same effect as the above embodiment can be provided.

Other embodiments

In the third embodiment, the frequency of the second carrier wave is changed in the surge reduction process. In other embodiments, the frequency of the first carrier wave may be changed, or the frequencies of the first carrier wave and the second carrier wave may be changed. In the third embodiment, the carrier frequency changed is determined in accordance with the modulation factor. In other embodiments, the carrier frequency changed may be changed to a predetermined value regardless of the modulation factor.

In the above-described embodiments, both the two power supplies provided independently, are secondary batteries represented by a battery or a capacitor. In other embodiments, the voltage source is not limited to the secondary battery as long as the voltage source is a power supply source provided independently. For example, one of the power supplies may be a secondary battery, and the other of the power supplies may be a fuel cell, or a generator including an internal combustion engine and a rotating electric machine. The configuration of the power supply is not limited by the type of the power supply.

The rotating electric machine in the above-described embodiments has three phases. In other embodiments, the rotating electric machine may have four or more phases. The rotating electric machine is not limited to a permanent magnet synchronous motor, and may be an induction motor or another synchronous motor. In the above-described embodiments, the rotating electric machine is used as a traction unit motor of the electric vehicle. In other embodiments, the rotary electric machine is not limited to the traction unit motor, and may be, for example, a so-called integrated starter generator (ISG) having both a starter function and an alternator function, or an accessory motor. The drive system for the electric motor may be applied to apparatuses other than vehicles. The present disclosure is not limited to the above-described embodiments, and may be implemented in various forms in the range that does not deviate from the scope of the present disclosure.

Hereinafter, aspects of the above-described embodiments will be summarized.

The drive system for the electric motor according to the present disclosure controls drive of a rotating electric machine (80) having windings (81, 82, 83) for a plurality of phases, and includes a first inverter (60), a second inverter (70), and a control unit (30). The first inverter includes first switching elements (61 to 66), and is connected to one end (811, 821, 831) of each of the windings and a first voltage source (11). The second inverter includes second switching elements (71 to 76) and is connected to the other end (812, 822, 823) of each of the windings and a second voltage source (12) provided separately from the first voltage source.

In a first aspect of the present disclosure, the control unit includes a first inverter control calculation section (31), a second inverter control calculation section (32), and a control synchronization section (35). The first inverter control calculation section controls an on-off operation of each of the first switching elements based on a first carrier wave and a first modulation wave. The second inverter control calculation section controls an on-off operation of each of the second switching elements based on a second carrier wave and a second modulation wave. When a sum of a voltage of the first voltage source and a voltage of the second voltage source is more than a voltage determination threshold, and torque of the rotating electrical machine is smaller than a torque determination threshold, the control synchronization section synchronizes the first carrier wave with the second carrier wave.

In a second aspect and a third aspect of the present disclosure, the control unit includes a first inverter control calculation section (31) and a second inverter control calculation section (32). The first inverter control calculation section controls an on-off operation of each of the first switching elements based on a first carrier wave and a first modulation wave. The second inverter control calculation section controls an on-off operation of each of the second switching elements based on a second carrier wave and a second modulation wave.

In the second aspect, when a sum of a voltage of the first voltage source and a voltage of the second voltage source is more than a voltage determination threshold, and torque of the rotating electric machine is smaller than a torque determination threshold, the control unit controls a modulation factor of the first modulation wave and a modulation factor of the second modulation wave to be different from each other.

In the third aspect, when a sum of a voltage of the first voltage source and a voltage of the second voltage source is more than a voltage determination threshold, and torque of the rotating electric machine is smaller than a torque determination threshold, the control unit controls at least one of a frequency of the first carrier wave and a frequency of the second carrier wave to be smaller than in an ordinary time.

Accordingly, short-time continuous switching can be avoided, so that a surge voltage can be reduced, and an insulation performance of the drive system for the electric motor can be improved.

What is claimed is:

1. A drive system for an electric motor, the system controlling drive of a rotating electric machine having windings for a plurality of phases, comprising:
- a first inverter that includes first switching elements and is connected to one end of each of the windings and a first voltage source;
- a second inverter that includes second switching elements and is connected to the other end of each of the windings and a second voltage source that is provided separately from the first voltage source; and
- a control unit that includes a first inverter control calculation section controlling an on-off operation of each of the first switching elements based on a first carrier wave and a first modulation wave, a second inverter control calculation section controlling an on-off operation of each of the second switching elements based on a second carrier wave and a second modulation wave, and a control synchronization section synchronizing the first carrier wave with the second carrier wave,
- wherein when a sum of a voltage of the first voltage source and a voltage of the second voltage source is more than a voltage determination threshold, and torque of the rotating electric machine is smaller than a torque determination threshold, the control synchronization section synchronizes the first carrier wave with the second carrier wave.

2. A drive system for an electric motor, the system controlling drive of a rotating electric machine having windings for a plurality of phases, comprising:
- a first inverter that includes first switching elements and is connected to one end of each of the windings and a first voltage source;
- a second inverter that includes second switching elements and is connected to the other end of each of the windings and a second voltage source that is provided separately from the first voltage source; and
- a control unit that includes a first inverter control calculation section controlling an on-off operation of each of the first switching elements based on a first carrier wave and a first modulation wave and a second inverter control calculation section controlling an on-off operation of each of the second switching elements based on a second carrier wave and a second modulation wave,
- wherein when a sum of a voltage of the first voltage source and a voltage of the second voltage source is more than a voltage determination threshold, and torque of the rotating electric machine is smaller than a torque determination threshold, the control unit controls a modulation factor of the first modulation wave and a modulation factor of the second modulation wave to be different from each other.

3. The drive system for the electric motor, according to claim 2,
- wherein the control unit controls one of the modulation factor of the first modulation wave and the modulation factor of the second modulation wave to be more than 1 and controls the other of the modulation factor of the first modulation wave and the modulation factor of the second modulation wave to be set in accordance with a drive request.

4. A drive system for an electric motor, the system controlling drive of a rotating electric machine having windings for a plurality of phases, comprising:
- a first inverter that includes first switching elements and is connected to one end of each of the windings and a first voltage source;
- a second inverter that includes second switching elements and is connected to the other end of each of the windings and a second voltage source that is provided separately from the first voltage source; and
- a control unit that includes a first inverter control calculation section controlling an on-off operation of each of the first switching elements based on a first carrier wave and a first modulation wave and a second inverter control calculation section controlling an on-off operation of each of the second switching elements based on a second carrier wave and a second modulation wave,
- wherein when a sum of a voltage of the first voltage source and a voltage of the second voltage source is more than a voltage determination threshold, and torque of the rotating electric machine is smaller than a torque determination threshold, the control unit controls at least one of a frequency of the first carrier wave and a frequency of the second carrier wave to be smaller than in an ordinary time.

5. The drive system for the electric motor, according to claim 4,
- wherein the control unit sets a frequency of the first carrier wave and a frequency of the second carrier wave to be lower as a modulation factor of the first modulation wave and a modulation factor of the second modulation wave are lower.

* * * * *